United States Patent
Acharya et al.

(10) Patent No.: US 9,935,856 B2
(45) Date of Patent: Apr. 3, 2018

(54) SYSTEM AND METHOD FOR DETERMINING END USER TIMING

(71) Applicant: AppDynamics LLC, San Francisco, CA (US)

(72) Inventors: Manoj Acharya, San Francisco, CA (US); Binil Thomas, San Francisco, CA (US); Adam Cath, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 150 days.

(21) Appl. No.: 14/245,938

(22) Filed: Apr. 4, 2014

(65) Prior Publication Data

US 2015/0288584 A1 Oct. 8, 2015

(51) Int. Cl.
*H04L 12/26* (2006.01)
*G06Q 10/06* (2012.01)
*H04L 29/08* (2006.01)

(52) U.S. Cl.
CPC ......... *H04L 43/08* (2013.01); *G06Q 10/0637* (2013.01); *H04L 43/04* (2013.01); *H04L 67/22* (2013.01); *H04L 67/1002* (2013.01)

(58) Field of Classification Search
CPC ......... H04L 43/08; H04L 43/04; H04L 67/22; H04L 67/1002; G06Q 10/0637
See application file for complete search history.

(56) References Cited

U.S. PATENT DOCUMENTS

| | | | |
|---|---|---|---|
| 8,266,281 B1 | 9/2012 | Carlson et al. | |
| 8,824,340 B2 * | 9/2014 | Castro Castro | H04L 12/14 370/259 |
| 2002/0099818 A1 * | 7/2002 | Russell | H04L 67/02 709/224 |
| 2004/0221034 A1 * | 11/2004 | Kausik | H04L 29/06 709/224 |
| 2006/0195396 A1 * | 8/2006 | Ganesan | G06Q 20/102 705/40 |
| 2006/0241997 A1 * | 10/2006 | Bhatawdekar | G06Q 10/06 705/7.17 |
| 2007/0083649 A1 | 4/2007 | Zuzga et al. | |
| 2009/0030966 A1 * | 1/2009 | Morck | G06F 17/30873 709/201 |
| 2009/0106251 A1 * | 4/2009 | Harris | G06F 17/30905 |
| 2013/0145367 A1 | 6/2013 | Moss et al. | |

(Continued)

OTHER PUBLICATIONS

U.S. Appl. No. 14/018,346, Manoj Acharya, Business Transaction Correlation With Client Request Monitoring Data, filed Sep. 4, 2013.

(Continued)

*Primary Examiner* — Uzma Alam
(74) *Attorney, Agent, or Firm* — Parker Ibrahim & Berg LLC; James M. Behmke; Stephen D. LeBarron

(57) ABSTRACT

A system automatically determines end user timing across multiple platforms and network browsers. End user timing data may be captured using one or more techniques. The techniques may include utilizing a navigation timing standard and handler call back functionality. The end user timing data may be analyzed to identify which technique's data is most accurate, and the most accurate end user timing data is then reported.

24 Claims, 5 Drawing Sheets

(56) References Cited

U.S. PATENT DOCUMENTS

2014/0156877 A1\* 6/2014 Tylik .................... G06F 3/0605
710/18
2015/0067031 A1 3/2015 Acharya

OTHER PUBLICATIONS

"Diagnosing Slow Web Servers with Time to First Byte" available at: http:www.websiteoptimization.com/speed/tweak/time-to-first-byte/ [accessed Feb. 18, 2015].
Loosley, Chris; "Rich Internet Applications: Design, Measurement, and management Challenges" available at: http://www.keynote.com/key-programs/emea/ebook/RichInternet_5.pdf [accessed Feb. 18, 2015].
"Managing RIA's [6]: Measurement Challenges" available at: http://www.webperformancematters.com/journal/2006/3/25/managing-rias-6-measurement-challenges.html [accessed Feb. 18, 2015].
"Web applications Performance Testing Metrics" by Agile Support Team, Feb. 18, 2013. Available at: http://www.agileload.com/agileload/blog/2013/02/18/web-applications-performance-testing-metrics [accessed on Feb. 18, 2015].
United Kingdom Application No. GB1407519.6 Search Report dated Feb. 20, 2015.

\* cited by examiner

A SYSTEM AND METHOD FOR
DETERMINING END USER TIMING

BACKGROUND OF THE INVENTION

The World Wide Web has expanded to provide web services faster to consumers. Web services may be provided by a web application which uses one or more services to handle a transaction. The applications may be distributed over several machines, making the topology of the machines that provides the service more difficult to track and monitor.

Monitoring a web application can include monitoring the user experience. Typically, the user experience is measured in time, for example how long does it take to load a web page. Determining end user timing for a web service can be difficult over different types of devices which use different platforms and network browsers. As such, it can be difficult to compare end user timing over multiple types of devices and platforms There is a need in the art for web service monitoring which may provide improved end user timing information

SUMMARY OF THE CLAIMED INVENTION

The present technology automatically determines end user timing across multiple platforms and network browsers. End user timing data may be captured using one or more techniques. The techniques may include utilizing a navigation timing standard and handler call back functionality. The end user timing data may be analyzed to identify which technique's data is most accurate, and the most accurate end user timing data is then reported.

End user timing may be determined in part using handler call backs. Handlers may be executed upon the occurrence of a particular event. A callback may be associated with a handler to make a call upon execution of the handler (at the occurrence of the event). Time stamps associated with receiving handler callback calls may be used to determine periods of end user timing.

An embodiment may include a method for monitoring a business transaction. A first set of metrics may be captured using handler objects in a network browser executing on a computer. The first set of metrics may be associated with a request by the browser. The first set of metrics may be captured with a second set of metrics retrieved from a browser interface. The second set of metrics may be associated with the request. The most accurate set of metrics of the first set of metrics and the second set of metrics may be reported.

An embodiment may include a system for monitoring a business transaction. The system may include a processor, a memory and one or more modules stored in memory and executable by the processor. When executed, the one or more modules may capture a first set of metrics using handler objects in a network browser executing on a computer, the first set of metrics associated with a request by the browser, compare the first set of metrics with a second set of metrics retrieved from a browser interface, the second set of metrics associated with the request, and report the most accurate set of metrics of the first set of metrics and the second set of metrics.

DETAILED DESCRIPTION

The present technology determines end user timing across multiple platforms. End user timing data may be captured using one or more techniques. The techniques may include a navigation timing standard and handler call back functionality. The end user timing data may be analyzed to determine which is most accurate, and the most accurate end user timing data is reported.

Different devices may utilize different browsers for providing network content. The browsers may have different specifications for operation and access into browser timing data. Some browsers, such as Internet Explorer by Microsoft, of Redmond, Wash., may be compatible with Navigation Timing (NT) protocols per the W3C standard. Browsers which are compatible with the NT protocol may be queried for various events in order to construct the end user timing. Other browsers such as Navigator by Apple Computer, Inc., of Cupertino, Calif., may not be compatible with the Navigation Timing standard.

In some instances, end user timing may be determined in part by handler call back. Handlers may be executed upon the occurrence of a particular event. A callback may be associated with a handler to make a call upon execution of the handler (at the occurrence of the event). Time stamps associated with receiving handler callback calls may be used to determine periods of end user timing.

The present technology may monitor any of several events associated with loading a page into a network browser. The events include but are not limited to a start of a request, the initial time at which a connection is made with a server, the time at which the first byte is received from the server, the time it takes for the document to download, and any time required to process the document.

Figure 1:
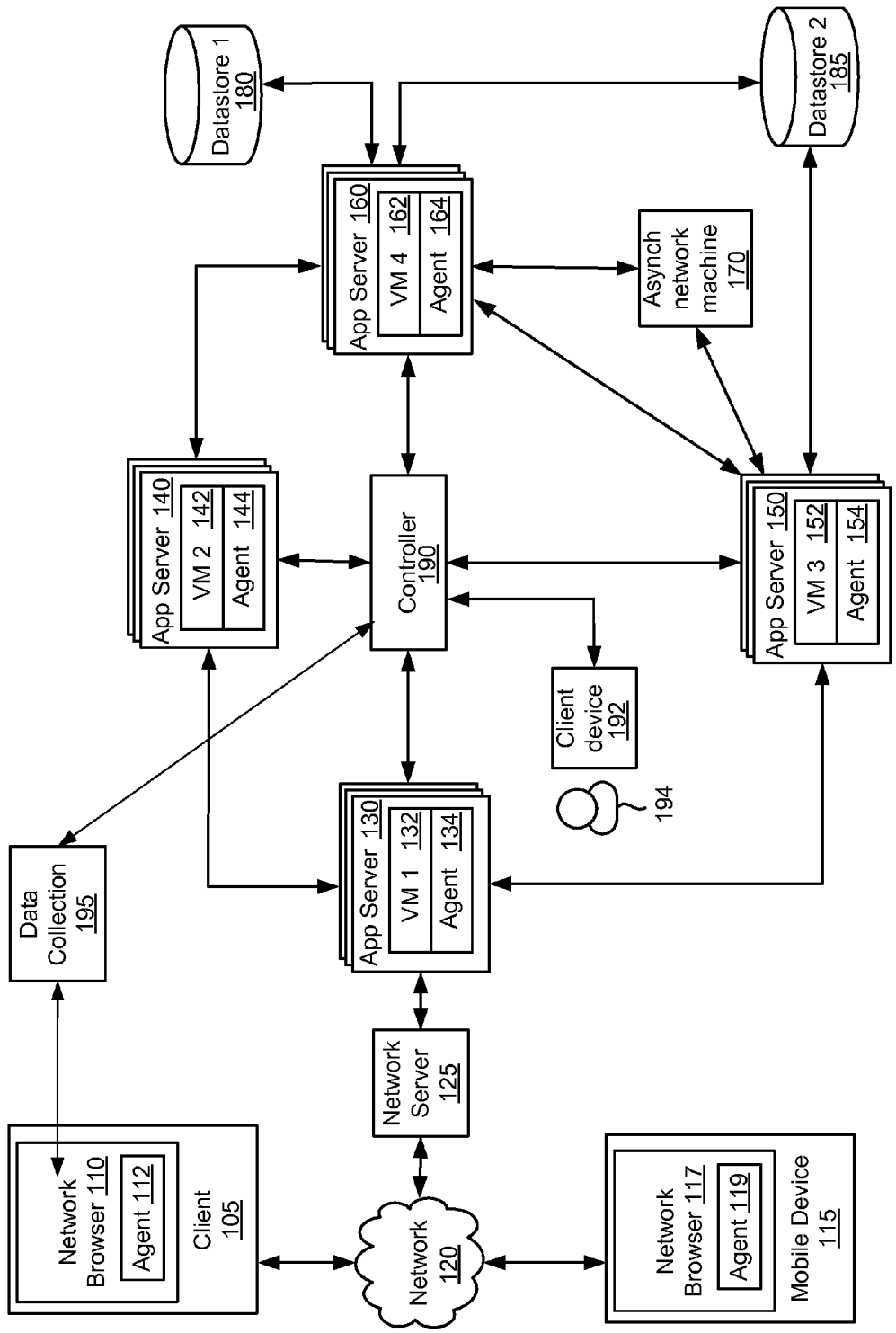
FIG. 1 is a block diagram of a system for determining end user timing.

FIG. 1 is a block diagram of a system for determining end user timing System 100 of FIG. 1 includes client device 105 and 192, mobile device 115, network 120, network server 125, application servers 130, 140, 150 and 160, asynchronous network machine 170, data stores 180 and 185, and controller 190.

Client device 105 may include network browser 110 and be implemented as a computing device, such as for example a laptop, desktop, workstation, or some other computing device. Network browser 110 may be a client application for viewing content provided by an application server, such as application server 130 via network server 125 over network 120. Mobile device 115 is connected to network 120 and may be implemented as a portable device suitable for receiving content over a network, such as for example a mobile phone, smart phone, or other portable device. Both client device 105 and mobile device 115 may include hardware and/or software configured to access a web service provided by network server 125.

Network 120 may facilitate communication of data between different servers, devices and machines. The network may be implemented as a private network, public network, intranet, the Internet, a Wi-Fi network, cellular network, or a combination of these networks.

Network server 125 is connected to network 120 and may receive and process requests received over network 120. Network server 125 may be implemented as one or more servers implementing a network service. When network 120 is the Internet, network server 125 may be implemented as a web server. Network server 125 and application server 130 may be implemented on separate or the same server or machine.

Application server 130 communicates with network server 125, application servers 140 and 150, controller 190. Application server 130 may also communicate with other machines and devices (not illustrated in FIG. 1). Application server 130 may host an application or portions of a distributed application and include a virtual machine 132, agent 134, and other software modules. Application server 130 may be implemented as one server or multiple servers as illustrated in FIG. 1.

Virtual machine 132 may be implemented by code running on one or more application servers. The code may implement computer programs, modules and data structures to implement, for example, a virtual machine mode for executing programs and applications. In some embodiments, more than one virtual machine 132 may execute on an application server 130. A virtual machine may be implemented as a Java Virtual Machine (JVM). Virtual machine 132 may perform all or a portion of a business transaction performed by application servers comprising system 100. A virtual machine may be considered one of several services that implement a web service.

Virtual machine 132 may be instrumented using byte code insertion, or byte code instrumentation, to modify the object code of the virtual machine. The instrumented object code may include code used to detect calls received by virtual machine 132, calls sent by virtual machine 132, and communicate with agent 134 during execution of an application on virtual machine 132. Alternatively, other code may be byte code instrumented, such as code comprising an application which executes within virtual machine 132 or an application which may be executed on application server 130 and outside virtual machine 132.

In embodiments, application server 130 may include software other than virtual machines, such as for example one or more programs and/or modules that processes AJAX requests.

Agent 134 on application server 130 may be installed on application server 130 by instrumentation of object code, downloading the application to the server, or in some other manner. Agent 134 may be executed to monitor application server 130, monitor virtual machine 132, and communicate with byte instrumented code on application server 130, virtual machine 132 or another application or program on application server 130. Agent 134 may detect operations such as receiving calls and sending requests by application server 130 and virtual machine 132. Agent 134 may receive data from instrumented code of the virtual machine 132, process the data and transmit the data to controller 190. Agent 134 may perform other operations related to monitoring virtual machine 132 and application server 130 as discussed herein. For example, agent 134 may identify other applications, share business transaction data, aggregate detected runtime data, and other operations.

Each of application servers 140, 150 and 160 may include an application and an agent. Each application may run on the corresponding application server or a virtual machine. Each of virtual machines 142, 152 and 162 on application servers 140-160 may operate similarly to virtual machine 132 and host one or more applications which perform at least a portion of a distributed business transaction. Agents 144, 154 and 164 may monitor the virtual machines 142-162 or other software processing requests, collect and process data at runtime of the virtual machines, and communicate with controller 190. The virtual machines 132, 142, 152 and 162 may communicate with each other as part of performing a distributed transaction. In particular each virtual machine may call any application or method of another virtual machine.

Asynchronous network machine 170 may engage in asynchronous communications with one or more application servers, such as application server 150 and 160. For example, application server 150 may transmit several calls or messages to an asynchronous network machine. Rather than communicate back to application server 150, the asynchronous network machine may process the messages and eventually provide a response, such as a processed message, to application server 160. Because there is no return message from the asynchronous network machine to application server 150, the communications between them are asynchronous.

Data stores 180 and 185 may each be accessed by application servers such as application server 150. Data store 185 may also be accessed by application server 150. Each of data stores 180 and 185 may store data, process data, and return queries received from an application server. Each of data stores 180 and 185 may or may not include an agent.

Controller 190 may control and manage monitoring of business transactions distributed over application servers 130-160. Controller 190 may receive runtime data from each of agents 134-164, associate portions of business transaction data, communicate with agents to configure collection of runtime data, and provide performance data and reporting through an interface. The interface may be viewed as a web-based interface viewable by mobile device 115, client device 105, or some other device. In some embodiments, a client device 192 may directly communicate with controller 190 to view an interface for monitoring data.

Controller 190 may install an agent into one or more virtual machines and/or application servers 130. Controller 190 may receive correlation configuration data, such as an object, a method, or class identifier, from a user through client device 192.

Data collection server 195 may communicate with client 105, 115 (not shown in FIG. 1), and controller 190, as well as other machines in the system of FIG. 1. Data collection server 195 may receive data associated with monitoring a client request at client 105 (or mobile device 115) and may store and aggregate the data. The stored and/or aggregated data may be provided to controller 190 for reporting to a user.

Figure 2:
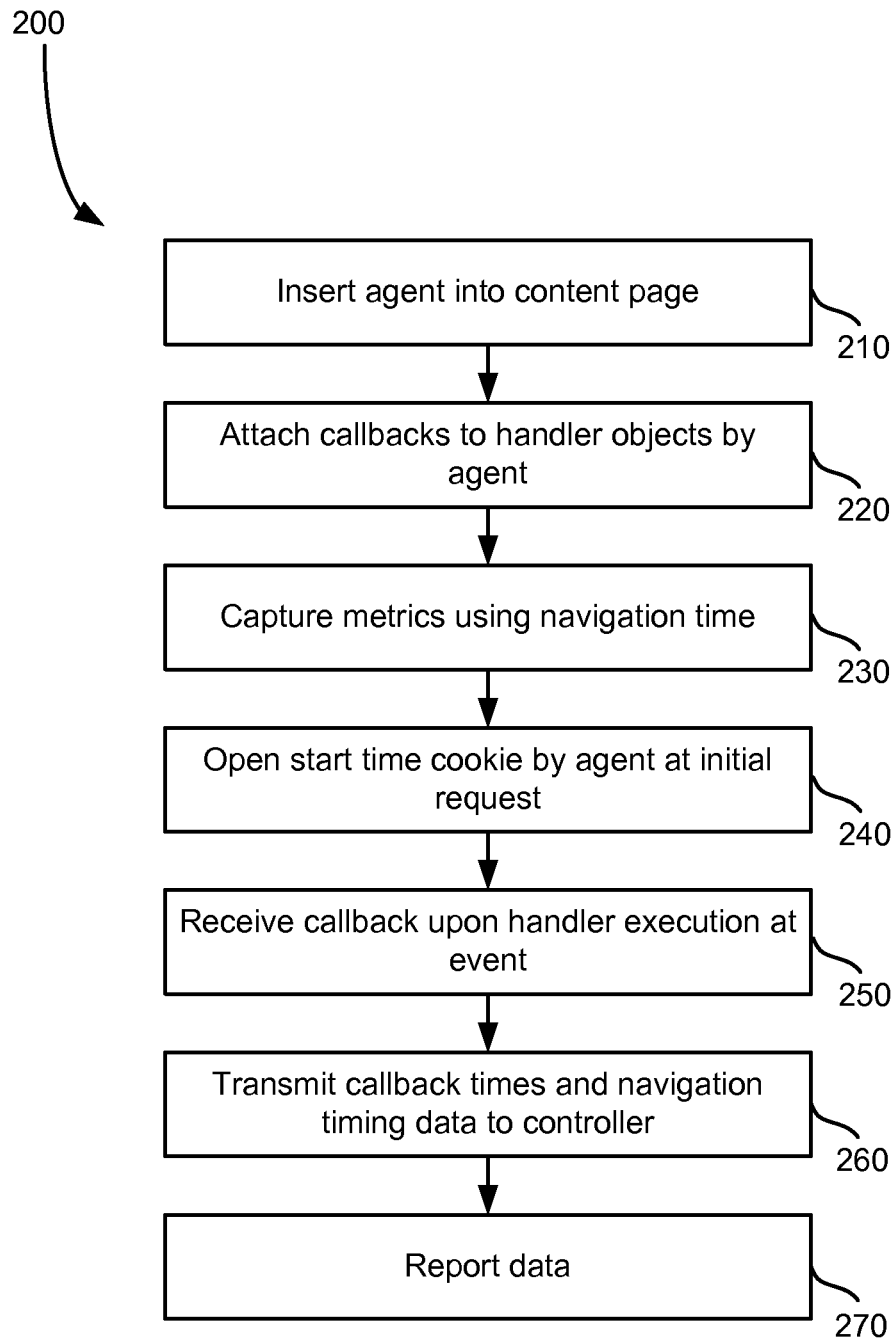
FIG. 2 illustrates a method for determining end user timing.

FIG. 2 illustrates a method for determining end user timing. First, an agent may be inserted into a content page at step 210. The agent may be inserted into a content page provided by the network service provider which manages application servers 130-160. In some embodiments, the agent may be implemented as java script and may be inserted into a content page by an application providing the content page to a requesting machine, such as client 105 or device 115.

Call backs may be attached to selected handler objects by an agent at a client device (105 or 115) at step 220. Handler objects perform a particular task in response to an event. Attaching a call back to a handler object results in a call being made to a destination specified within the call. When the handler determines that the event has occurred, the call is initiated. The agent may have a list of handler objects that are suitable for having call backs attached. For example, handler objects may have a call back attached if they indicate the time a content request is initiated, the time a content request is transmitted over an network, the time a first byte of data is received in response to a content request, the time at which a request is fully received, the time at which a document is generated, and the time at which a document is loaded into a network browser interface. Handler objects associated with other times may have a call back attached as well.

Metrics may be captured using a Navigation Timing protocol at step 230. In some embodiments, the navigation timing may be performed by querying the network browser NT API for information associated with end user timing. In some embodiments, browsers may use JMX metrics to provide the navigation timing. Examples of JMX metrics that may be retrieved through the Navigation Timing protocol include a time a content request is initiated, a time a content request is transmitted over an network, a time a first byte of data is received in response to a content request, a time at which a request is fully received, a time at which a document is generated, and a time at which a document is loaded into a network browser interface A start time cookie may be opened by an agent at an initial request at step 240. The initial request may be the detection of a page start based on a user request, or some other initiating event for starting the loading of content into a content page for a network browser. The page start initiates the monitoring of content loading and displaying and records a timestamp at the monitoring beginning within a cookie.

A call back is received upon the handler execution at an event at step 250. When an event occurs, such as with a call back handler, the java script is informed. The time of the call back is stored, for example in the cookie, for a particular request. More information for receiving call back information upon a handler execution at an event is discussed with respect to the method of FIG. 3.

Call back times and navigation timing data may be transmitted to a controller at step 260. The data may be transmitted to a controller by an agent that collected the data. The data may then be reported at step 270. Reporting the data may include processing the data and reporting the data in a readable form. More information regarding reporting the data is discussed with respect to the method of FIG. 4.

Figure 3:
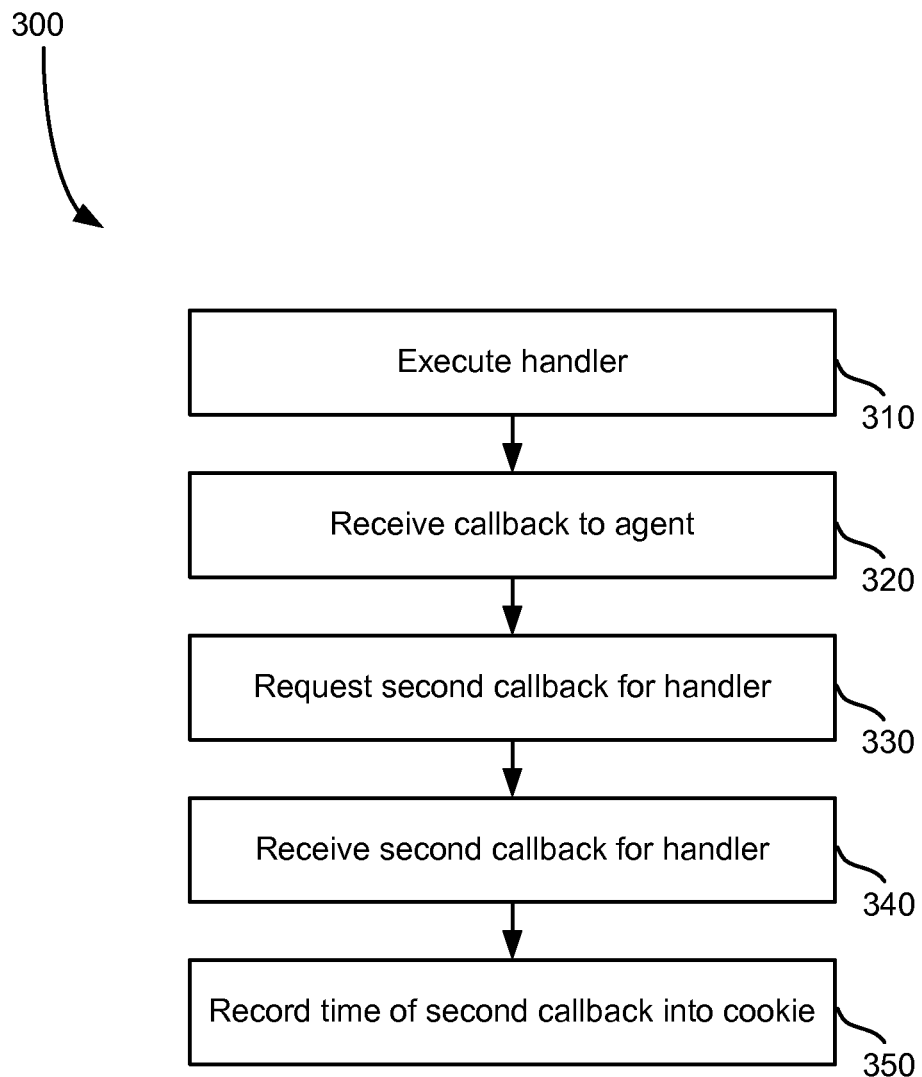
FIG. 3 illustrates a method for receiving call back information.

FIG. 3 is a method for receiving a call back upon a handler execution. First, a handler is executed at step 310. The handler may be executed at an event associated with the handler, such as receiving data, starting to load data, or determining that a document load is complete. A call back may be made to an agent at step 320. The call back is initiated by the handler and transmitted towards the agent within the content page. Once the call back is received by the agent, a second call back for that particular handler is requested at step 330. In some embodiments, it is desirable to receive a call back as the last of several call backs for the particular handler. When a handler adds the most recently received call back to the bottom of a list, a second call back request made when the handler is executing will likely be at the bottom of the call back list for that handler. By being placed at the bottom of a list for call backs, the call back to the agent may accurately detect the time that all the other call backs have been made by the handler, which provides a more accurate timing for when the handler object event has truly been concluded. A second call back for the particular handler is received at step 340. The time of the second call back is then recorded into the cookie at step 350. The call back time may be recorded by an agent.

Figure 4:
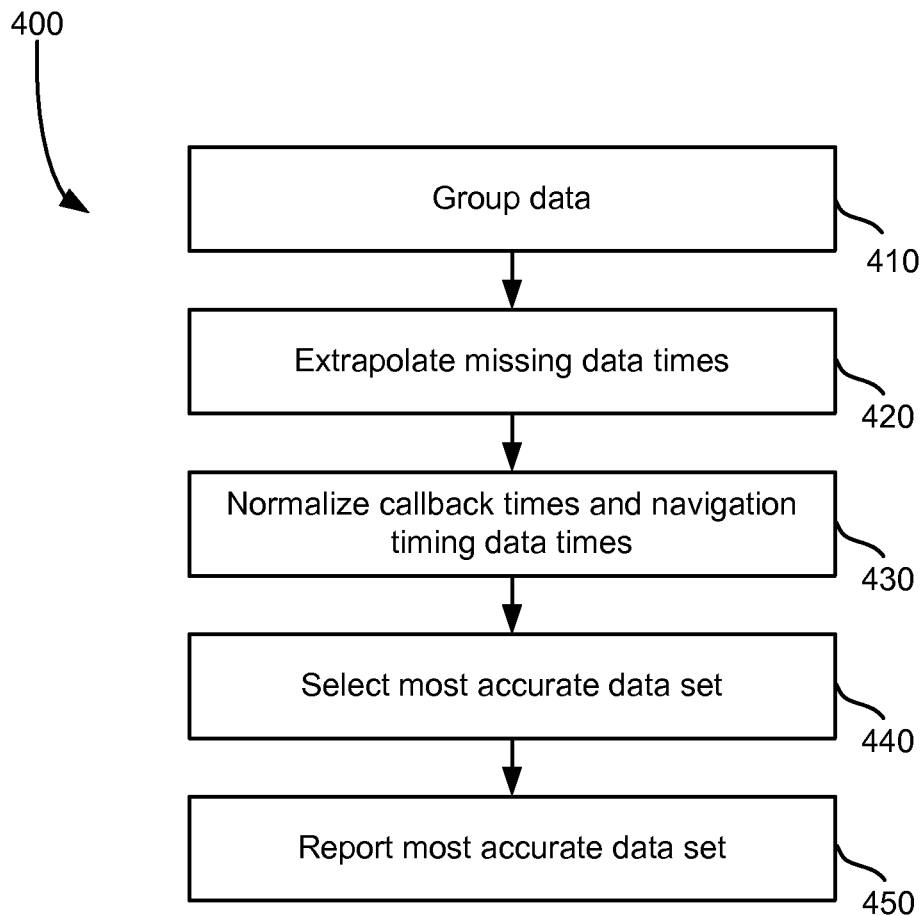
FIG. 4 illustrates a method for reporting data.

FIG. 4 is a method for reporting data. The method of FIG. 4 may provide more detail for step 270 of the method of FIG. 2. First, data is grouped at step 410. Grouping data may include piecing together portions of a transaction from the point of view of the end user. For example, for a particular request, data associated with different a particular request may be grouped together. For example, data associated with the time at which a request is initiated, the time at which a request is sent, and the time at which a document is received may be grouped together for a particular request.

Missing data times may be extrapolated at step 420. In some embodiments, receiving call backs from handlers may not be used to determine as many timing points as that associated with a navigation timing API. Data points that are included in a navigation timing data model may be extrapolated within data points associated with a handler and call back model. Call back times and navigation timing data times may then be normalized at step 430. The normalization of the times enables a better comparison of the navigation timing data and the call back data time data. The most accurate data set may then be selected at step 440. Selection of an accurate data set may be performed automatically and may be based on whether data points are in an expected order (such as whether a document load occurs before or after a request is sent), whether the data times are within a particular threshold, and other parameters. The most accurate data set selected at step 450 is then reported at step 440.

Figure 5:
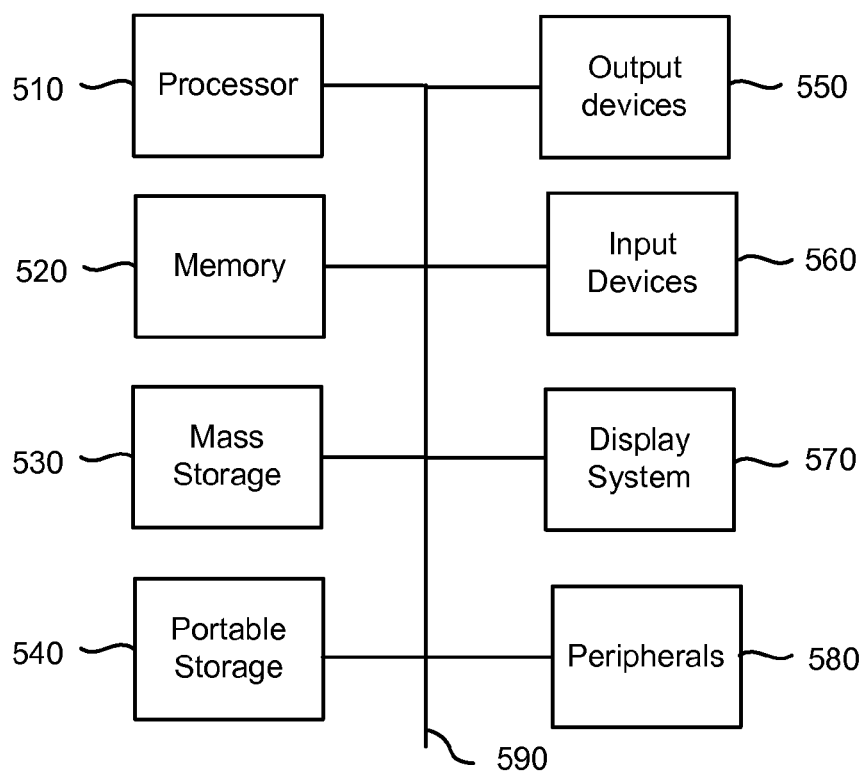
FIG. 5 is a block diagram of a computer system for implementing the present technology.

FIG. 5 is a block diagram of a computer system for implementing the present technology. System 500 of FIG. 5 may be implemented in the contexts of the likes of clients 105 and 192, network server 125, application servers 130-160, and data stores 190-185. A system similar to that in FIG. 5 may be used to implement mobile device 115, but may include additional components such as an antenna, additional microphones, and other components typically found in mobile devices such as a smart phone or tablet computer.

The computing system 500 of FIG. 5 includes one or more processors 510 and memory 510. Main memory 510 stores, in part, instructions and data for execution by processor 510. Main memory 510 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 510 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 510.

Portable storage device 540 operates in conjunction with a portable non-volatile storage medium, such as a floppy disk, compact disk or Digital video disc, to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

When implementing a mobile device such as smart phone or tablet computer, the computer system 500 of FIG. 5 may include one or more antennas, radios, and other circuitry for communicating over wireless signals, such as for example communication using Wi-Fi, cellular, or other wireless signals.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for monitoring a business transaction, comprising: capturing, by agents installed on client computing devices in communication with a remote server over a network, a first set of metrics using handler objects in different network browsers executing on the client computing devices, the first set of metrics associated with a request by a corresponding one of the different network browsers and each agent is inserted into a content page displayed by the corresponding one of the different network browsers at a corresponding one of the client computing devices;

comparing, by each agent on the corresponding one of the client computing devices, the first set of metrics with a second set of metrics retrieved from a browser interface at the corresponding one of the client computing devices to determine whether the first set of metrics or the second set of metrics are most accurate, the second set of metrics associated with the request, wherein the most accurate set of metrics of the first set of metrics and the second set of metrics is determined based on whether data points are in an expected order or whether data times are within a particular threshold; and reporting to the remote server by the agents on the client computing devices the first set of metrics or the second set of metrics depending upon which is most accurate.

2. The method of claim 1, further comprising associating, by each agent at the corresponding one of the client computing devices, a first call back to one of the handler objects.

3. The method of claim 2, further comprising storing, by each agent at the corresponding one of the client computing devices, timing data upon receiving a call of the associated call back.

4. The method of claim 3, further comprising associating a second call back to a particular handler object upon receiving the call of the associated call back, wherein the associating the first and second call backs are based on a list of handler objects that are suitable for associating with call backs.

5. The method of claim 1, further comprising normalizing the first set of metrics and the second set of metrics.

6. The method of claim 1, further comprising receiving, by each agent at the corresponding one of the client computing devices, a first call back upon execution of a first one of the handler objects associated with a first network browser platform and a second call back with a second one of the handler objects associated with a second network browser platform.

7. The method of claim 1, further comprising placing a most recently received call back to a bottom of a list.

8. The method of claim 1, wherein the second set of metrics is retrieved using a navigation timing interface.

9. A non-transitory computer readable storage medium having embodied thereon a program, the program being executable by a processor to perform operations for monitoring a business transaction, the operations comprising:

capturing, by agents installed on client computing devices in communication with a remote server over a network, a first set of metrics using handler objects in different network browsers executing on the client computing devices, the first set of metrics associated with a request by a corresponding one of the different network browsers and each agent is inserted into a content page displayed by the corresponding one of the different network browsers at a corresponding one of the client computing devices;

comparing, by each agent on the corresponding one of the client computing devices, the first set of metrics with a second set of metrics retrieved from a browser interface at the corresponding one of the client computing devices to determine whether the first set of metrics or the second set of metrics are most accurate, the second set of metrics associated with the request, wherein the most accurate set of metrics of the first set of metrics and the second set of metrics is determined based on whether data points are in an expected order or whether data times are within a particular threshold; and reporting to the remote server by the agents on the client computing devices, the first set of metrics or the second set of metrics depending upon which is most accurate.

10. The non-transitory computer readable storage medium of claim 9, wherein the operations include associating, by each agent at the corresponding one of the client computing devices, a first call back to one of the handler objects.

11. The non-transitory computer readable storage medium of claim 10, wherein the operations include storing, by each agent at the corresponding one of the client computing devices, timing data upon receiving a call of the associated call back.

12. The non-transitory computer readable storage medium of claim 11, wherein the operations include associating a second call back to a particular handler object upon receiving the call of the associated call back, wherein the associating the first and second call backs are based on a list of handler objects that are suitable for associating with call backs.

13. The non-transitory computer readable storage medium of claim 9, wherein the operations include normalizing the first set of metrics and the second set of metrics.

14. The non-transitory computer readable storage medium of claim 9, wherein the operations include receiving, by each agent at the corresponding one of the client computing devices, a first call back upon execution of a first one of the handler objects associated with a first network browser platform and a second call back with a second one of the handler objects associated with a second network browser platform.

15. The non-transitory computer readable storage medium of claim 9, wherein the operations include placing a most recently received call back to a bottom of a list.

16. The non-transitory computer readable storage medium of claim 9, wherein the second set of metrics is retrieved using a navigation timing interface.

17. A system for monitoring a business transaction, comprising:
   a processor;
   a memory; and
   one or more modules stored in memory and executable by a processor to perform operations including:
      capture, by agents installed on client computing devices in communication with a remote server over a network, a first set of metrics using handler objects in different network browsers executing on the client computing devices, the first set of metrics associated with a request by a corresponding one of the different network browsers and each agent is inserted into a content page displayed by the corresponding one of the different network browsers at a corresponding one of the client computing devices;
      compare, by each agent on the corresponding one of the client computing devices, the first set of metrics with a second set of metrics retrieved from a browser interface at the corresponding one of the client computing devices to determine whether the first set of metrics or the second set of metrics are most accurate, the second set of metrics associated with the request, wherein the most accurate set of metrics of the first set of metrics and the second set of metrics is determined based on whether data points are in an expected order or whether data times are within a particular threshold; and
      report to the remote server by the agents on the client computing devices, the first set of metrics or the second set of metrics depending upon which is most accurate.

18. The system of claim 17, wherein the operations include associate, by each agent at the corresponding one of the client computing devices, a first call back to one of the handler objects.

19. The system of claim 18, wherein the operations include store, by each agent at the corresponding one of the client computing devices, timing data upon receiving a call of the associated call back.

20. The system of claim 19, wherein the operations include associate a second call back to a particular handler object upon receiving the call of the associated call back, wherein the associating the first and second call backs are based on a list of handler objects that are suitable for associating with call backs.

21. The system of claim 17, wherein the operations include normalize the first set of metrics and the second set of metrics.

22. The system of claim 17, wherein the operations include receive, by each agent at the corresponding one of the client computing devices, a first call back upon execution of a first one of the handler objects associated with a first network browser platform and a second call back with a second one of the handler objects associated with a second network browser platform.

23. The system of claim 17, wherein the operations include place a most recently received call back to a bottom of a list.

24. The system of claim 17, wherein the second set of metrics is retrieved using a navigation timing interface.

* * * * *